United States Patent [19]

Desroches

[11] Patent Number: 4,805,537

[45] Date of Patent: Feb. 21, 1989

[54] VEHICLE AND JOIST MONORAIL TRACKWAY AND METHOD OF TRANSPORTING ROOF DECKING THEREOVER

[76] Inventor: Romeo Desroches, 65 Charlemont cres., Scarborough, Ontario, Canada

[21] Appl. No.: 97,653

[22] Filed: Sep. 16, 1987

[30] Foreign Application Priority Data

Oct. 28, 1986 [CA] Canada .................................. 521653

[51] Int. Cl.⁴ .............................................. B60D 1/48

[52] U.S. Cl. .................................... 104/246; 104/247; 410/45; 410/53; 410/92

[58] Field of Search ............... 104/118, 119, 242, 247; 410/92, 45, 53

[56] References Cited

U.S. PATENT DOCUMENTS

| | | | |
|---|---|---|---|
| 2,116,150 | 5/1938 | Howie et al. | 410/92 X |
| 4,092,931 | 6/1978 | Wulf et al. | 104/242 X |
| 4,423,685 | 1/1984 | Kerckhoff | 104/119 X |
| 4,592,536 | 6/1986 | Jasinski | 104/247 X |

FOREIGN PATENT DOCUMENTS

| | | | |
|---|---|---|---|
| 1430999 | 11/1968 | Fed. Rep. of Germany | 104/119 |

*Primary Examiner*—Stephen Hepperle
*Attorney, Agent, or Firm*—K. Maxwell Hill

[57] ABSTRACT

A pair of truck vehicles are manually moveable along the top and side edge running surfaces of parallel joist members of a factory roof a-building. Each truck runs on a separate joist and each has wheels running on the top surface of the joist with horizontal axles journaled to the truck chassis and has pairs of guide wheels with verticle axles journaled to the chassis and running on top side edge of the joist. The trucks carry between them bundles of corrugated sheet steel roof decking for manually and sequentially fitting to the roof of the factory from the trucks.

3 Claims, 2 Drawing Sheets

VEHICLE AND JOIST MONORAIL TRACKWAY AND METHOD OF TRANSPORTING ROOF DECKING THEREOVER

FIELD OF INVENTION

The present invention relates to vehicle trucks for transporting loads of building material over a factory roof a-building by using the steel joists thereof as monorail trackways to carry the vehicle trucks. In particular the present invention contemplates using the top and side edges of a steel roof-truss joist as the running surfaces for wheels having horizontal axles journalled in the chassis of the vehicle and for pairs of guide wheels having vertical axles journalled to the chassis; the joist and trucks with the guide wheels in gripping relation to the joist edges becoming a stable load carrying monorail system. The trucks are used in pairs each running on a joist parallel to the other. A bundle of corrugated sheets of steel roof decking is transported on and between the pair of trucks. Individual sheets of decking are removed from the trucks for fitting to the roof as the trucks are pushed along the joist-trackway. Means are provided to the gude wheels to allow workmen to easily remove the truck from one track for setting upon a new path of travel; the trucks are made of light-weight material such that a workman could manually adjust and lift it to another joist-track.

DISADVANTAGE OF THE PRIOR METHOD

In the construction of buildings having large expanses of roof it is known that where the usual placement of steel deck sheets cannot be done by cranes, agile workmen must carry the cumbersome sheets manually by walking with their load along a joist. It is a particularly dangerous occupation and many accidents occur when men become overbalanced while manipulating the sheets into place and fall from the joist. There is a long felt want for a mechanical method of laying roof decking or at least of a means of assisting workmen with the task.

OBJECTS OF THE INVENTION

It is the principal object of the present invention to provide a method and means for transporting building materials over a roof deck being constructed by using the joist surfaces as a monorail trackway and running thereover a light weight truck vehicle to carry the material.

It is another object of the invention to have at least two wheels of the truck running one behind the other on the upper surface of the joist and having horizontal axles journaled to the truck chassis; and to have pairs of guide wheels fore and aft of the running wheels running on the side edges of the joist with vertical axles journalled in the truck chassis of the vehicle.

It is a further object of the invention to have the guide wheels easily adjustable for removeability by manual means from the joist and the trucks of light-weight material to allow a workman to carry the truck vehicle to another joist for continuous laying of a roof deck or the like.

SUMMARY OF THE INVENTION

A means and method of transporting bundles of corrugated sheet steel decking over a factory roof being built consists in; providing a pair of vehicles having each at least two wheels tandemly rotatable along a surface of a joist of the factory; the wheels being journalled to the vehicle chassis by horizontal axles. A pair of guide wheels each having inwardly grooved running edges are adapted to run along the top outward edge of the joist and each being journalled on vertical axles attached to the vehicle chassis fore and aft of the load bearing tandem wheels. The vehicles run on parallel joists of the building factory roof and carry the decking between them. The upper side of the vehicle chassis have roller members with horizontal axes parallel to the path of travel of the vehicle on the monorail joist; the roller members allowing the bundle of decking sheets to adjust to any deviation in the trackways of the joists from the parallel and preventing binding of the combination of vehicles and bundle.

The guide wheels are fixedly adjustable to the top side edges of the monorail joist trackway to firstly, maintain the vehicle in constant gripping and running stance on the joist and, secondly to allow a workman to quickly remove the vehicle from one joist running surface to another. Upper upstanding flange members are centrally fixed to the topside of the vehicle chassis to hold the bundle of decking from sliding off when the combination is pushed along the joist trackway.

IN THE DRAWINGS

With the foregoing in view, and such other objects, advantages or novel features as may become apparent from consideration of this disclosure and specification, the present invention consists of the concept which is comprised, embodied, embraced, and included in the method, construction, arrangement and combination of parts, or new use of any of the foregoing herein exemplified in one or more specific embodiments of such concept, reference being had to the accompanying drawings in which like reference numerals refer to like parts.

THE PREFERRED EMBODIMENT OF THE INVENTION AND OPERATION THEREOF

Figure 1:
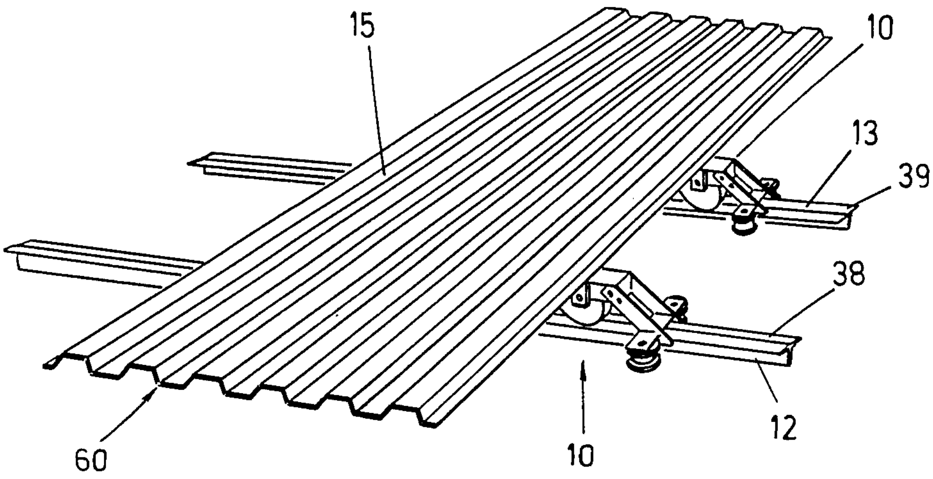
FIG. 1 is a view of two vehicles of the invention shown carrying a sheet of steel corrugated decking between them while each runs on the top of a joist.

In the drawings numeral 10 indicates a vehicle truck of the invention, 12, 13 are the top sides of a steel truss joist and 15 is a sheet of corrugated sheet decking material.

Figure 2:
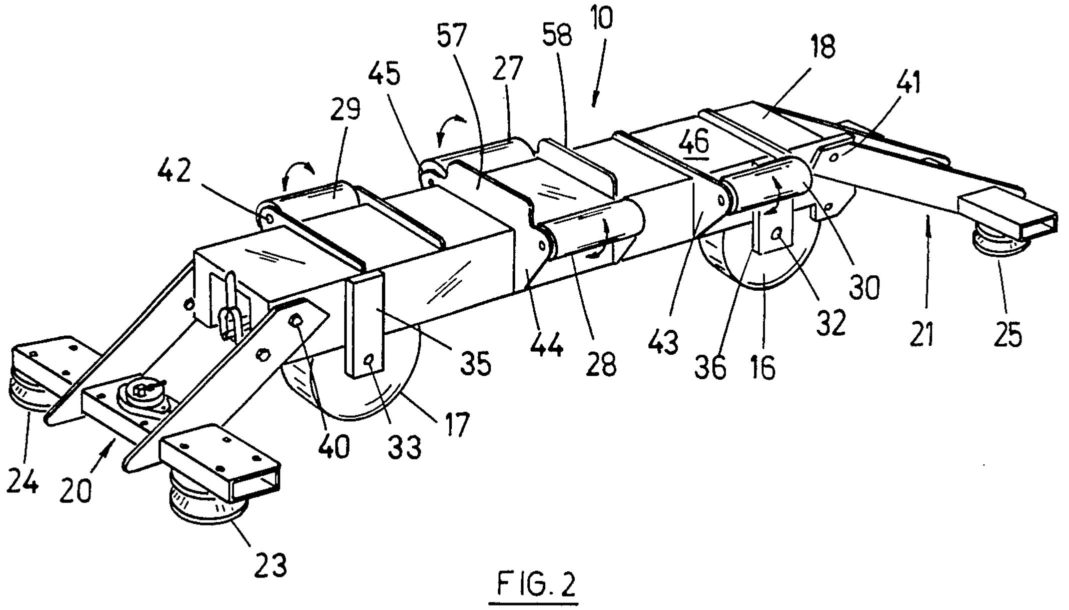
FIG. 2 is a top perspective view of one of the pair of vehicle trucks.

The view enumerated FIG. 2 two wheels 17, 18 are attached to the vehicle chassis 18 by axels 33 32, journalled in brackets 35, 36 extending downwardly from chassis 18. Axels 33, 32 are horizontal to the path of travel of the trucks 10 and to the monorail joist track-way s 12, 13, surfaces 38, 39. Two wheeled guideways 20, 21, are pivotally attached at 40 41 to the chassis 18 fore and aft of the load bearing wheels 16, 17. The guideways 20 21 comprise inwardly grooved pulley-like wheels 23 24, and 25. Cylindrical rollers 27 28, 29, 30 are horizontally rotatable on the upper side of the chassis and adapted to contact and hold the lower surface of the sheet of steel decking. The rollers have axles or bearings in line or parallel with the path of travel of the truck 10. The purpose of the rollers is to prevent the combination of pairs of trucks 10 and the load of sheets held therebetween from binding together and against the trackways 12, 13, whwnever the tracks diverge from the parallel. The shifting of the load of sheets 15 by means of the rollers allows for free movement of the combination across the factory roof for placement of the decking in the usual sequential manner by manual labour. The rollers 27 28, 29, 30 are held to chassis 18 by bracket members 45, 44, 42 43 upstanding from the top side 46 of the chassis 18.

Figure 3:
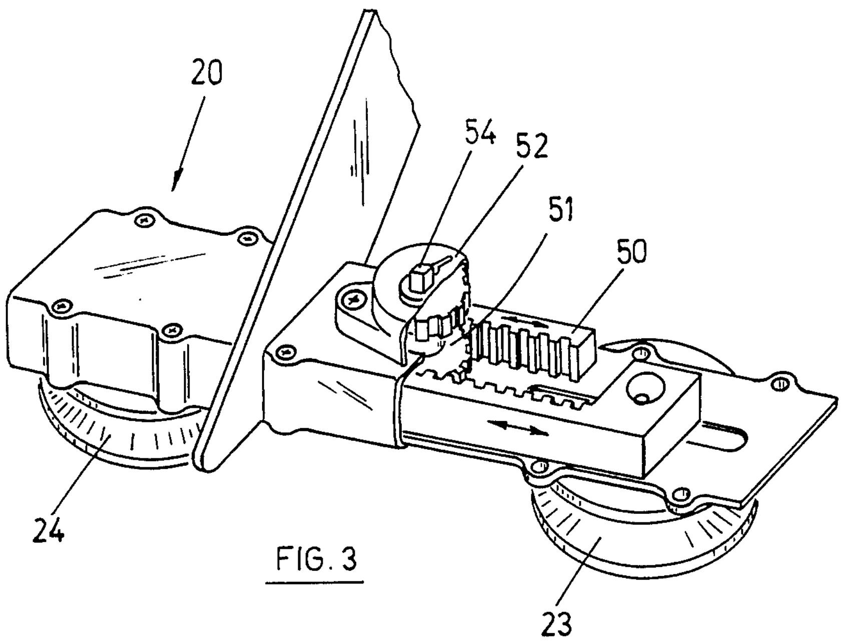
FIG. 3 is a partly cut-away view of the guide wheels showing the ratchet means for adjusting them to the joist monorail.
Figure 4:
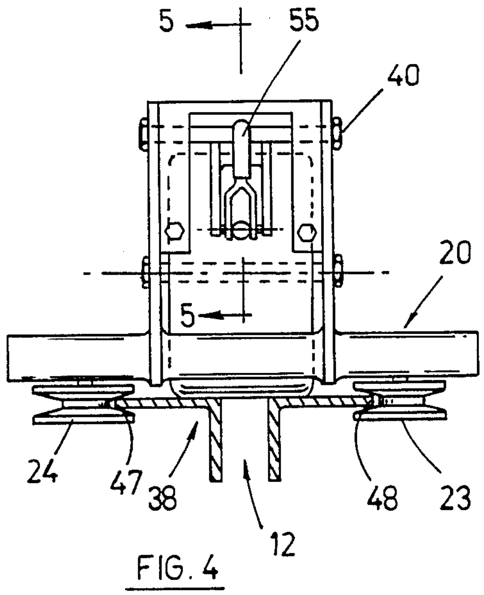
FIG. 4 is an end view of a vehicle truck showing the top of a steel joist in section.

FIGS. 3 and 4 show the method of holding the guide-wheels in contact with the joist edge and the means of adjusting the wheels inwardly and outwardly. Joist 12 having an upper running surface 38 has upper and outer side edges 47, 48, against which the grooves of pulley wheels 24, 23, interfit by means of rack and pinion means 50, 51, controlled by ratchet means 52. A workman can adjust the rack and pinion 50, 51, by attaching wrench means to nut 54 on the ratchet 52 to open or close the rack 50 as indicated by the arrows of FIG. 3.

Figure 5:
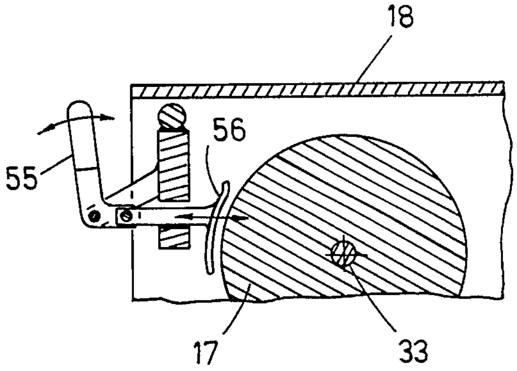
FIG. 5 is a view taken along the line 5-5 of FIG. 4 to show details of the braking means of the invention.

A braking system is provided the device as shown in FIG. 5 where a brake shoe 56 can be applied manually to wheel 17 by means of lever 55. Whenever the load is being removed or laid on to the trucks the brake is applied to prevent the trucks from rolling down the joist as it has been found that the slightest wind on top of the factory will move the combination along.

Figure 6:
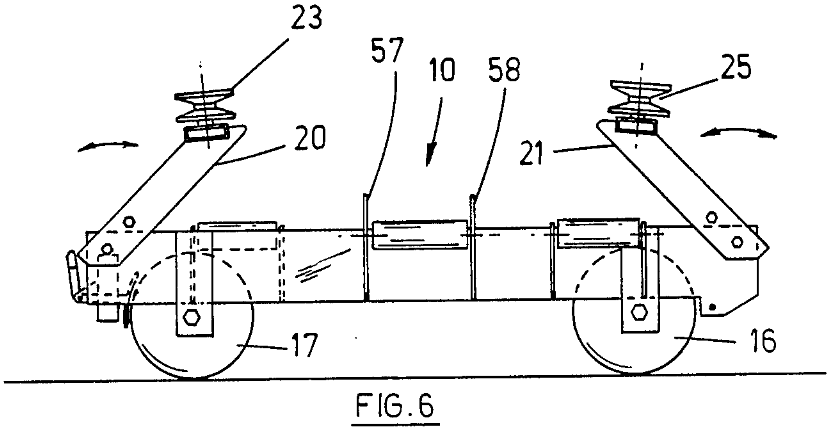
FIG. 6 is a side elevation view of the truck of the invention showing the means of swinging the guide wheels out of the way for a workman to manually carry it.

The trucks are made of light-weight material such as aluminium and the load wheels of light weight but hard rubber or plastic. A workman can easily lift a truck 10 and the guideways are pivottably moved up as shown in FIG. 6 and arrows thereon drawn, to allow him to quickly remove the truck from the joist and place it on another for further transport of material.

Two upstanding members 57, 58, are located transversely of the upward side 46 of the chassis 18 and at either end of the rollers 27, 28, and are spaced apart a distance slightly greater than the width 60 of a corrugation of sheet 15 to provide a transfer point of the forward force of the moving truck 10 to the bundle of sheets of decking carried. The fit of the corrugation 60 in the slot provided by wall members 57, 58, gives freedom to the bundle carriedto shift moderately and slide on the rollers 27,28,29,30, when the joists acting as the pair of monorails deviate fro the parallel and when obstructions such as factory columns, are encountered in the travel of the trucks across the roof of the factory. It is contemplated that the bundle of sheets 15 can be moved at an angle of 45 degrees from the position shown in FIG. 1 to avoid a column protruding from the roof deck and obstructing the path of travel of the trucks.

In order to impart requisite descriptive consistancy between parts referred to in the foregoing statement of the invention and the definition of such parts in the following claims 12 and 13 are the track-units; 38,39 are flanges; 10 is the roof decking carrying truck; 23,24 are guiding elements; 27, 28 are roof-decking supporting roller means; 29, 30 are roof-decking skew facilitating means;

56 is the clamping means; 15 is the roof decking; 16, 17 are the rotary track riding means; 20 21 are roller guiding element assemblies; and it is understood that the single sheet 15 of roof decking represents a stacked bundle of sheets being carried.

What I claim is:

1. A means for transporting sheets of roof-decking over a roof for installation thereon, comprising in combination with a joist member having an upper flange with parallel side edges thereto serving as a track for said means;

a roof-decking carrying truck embodying a plurality of rotary guiding elements on said truck engageable with said joist, rotary joist-riding means also on said truck for supporting and moving said truck along said joist, said truck including roof-decking supporting means spanning said rotary guiding elements; means for selectively engaging and disengaging said guiding elements from said joist including means for raising and lowering said guiding elements clear of said joist independently of the roof decking supporting means; means for clamping the guiding elements against the edges of the joist; said truck includes roof-decking support means in the form of a pair of parallel ly spaced rollers having their axes of rotation horizontal and perpendicular to the direction of travel of the truck on the joist and allowing the said roof-decking to be skewed angularly to said path of travel for facilitating off-loading of decking sheets and the avoidance of vertical obstructions upstanding from the roof when the truck is pushed along the joist; and load transfer members upstanding from said roof decking supporting means maintaining said decking sheets thereon when the truck is moved forward on the joist-track.

2. The invention according to claim 1 in which said guiding elements are in the form of inwardly grooved rollers adapted to grip the side edges of the joist flange and are rotatable about a vertical axis in situ, and which includes a rotary guide element assembly to which said rotary guide elements are journalled and pivotably connected for vertical rotation to each opposite end of said roof decking supporting means.

3. The invention as in claim 1 or 2 having a pair of axially parallel and offset rollers on either side of said roof decking supporting means and situate at opposite ends thereof, to facilitate the skewing of the load of roof decking sheets carried thereon for off loading therefrom and avoidance of obstructions in the path of the advancing truck on said joist track.

* * * * *